INVENTORS
HERMAN K.A. DE LANGE
VIKTOR POLLASCHEK
BY
Frank R. Jifari
AGENT

INVENTORS
HERMAN K.A. DE LANGE
VIKTOR POLLASCHEK
BY
Frank R. Jeifari
AGENT

INVENTORS
HERMAN K.A. DE LANGE
VIKTOR POLLASCHEK
BY
Frank R. Jeffrey
AGENT

INVENTORS
HERMAN K.A. DE LANGE
VIKTOR POLLASCHEK
BY
Frank R. Trifari
AGENT

INVENTORS
HERMAN K.A.DE LANGE
VIKTOR POLLASCHEK
BY
Frank R. Trifari
AGENT 3,424,965

DEVICE FOR SWITCHING THE MOVEMENTS OF A TAPE-SHAPED RECORD CARRIER IN RECORDING AND/OR PLAY-BACK APPARATUS

Herman Kasper Adriaan De Lange, Klosterneuburg, and Viktor Pollaschek, Vienna, Austria, assignors to North American Philips Company Inc., New York, N.Y., a corporation of Delaware Filed Mar. 10, 1965, Ser. No. 438,577
U.S. Cl. 318—284 7 Claims
Int. Cl. H02p *1/22, 3/20, 1/40, 5/00*

ABSTRACT OF THE DISCLOSURE

A tape driving apparatus designed to compensate for rapid directional and/or speed changes, is provided with a switching system responsive to the back EMF of the tape drive motor, or to its rotational speed, for generating a control signal having a duration proportional to the time required for the driving spindle to come to a stop. The control signal energizes an electrical switch which in turn mechanically locks the manual operating members of the apparatus into position, preventing their use until the drive spindle has stopped. In a further embodiment, the operating members are rendered electrically inoperative for the duration of the control signal.

Figure 1:
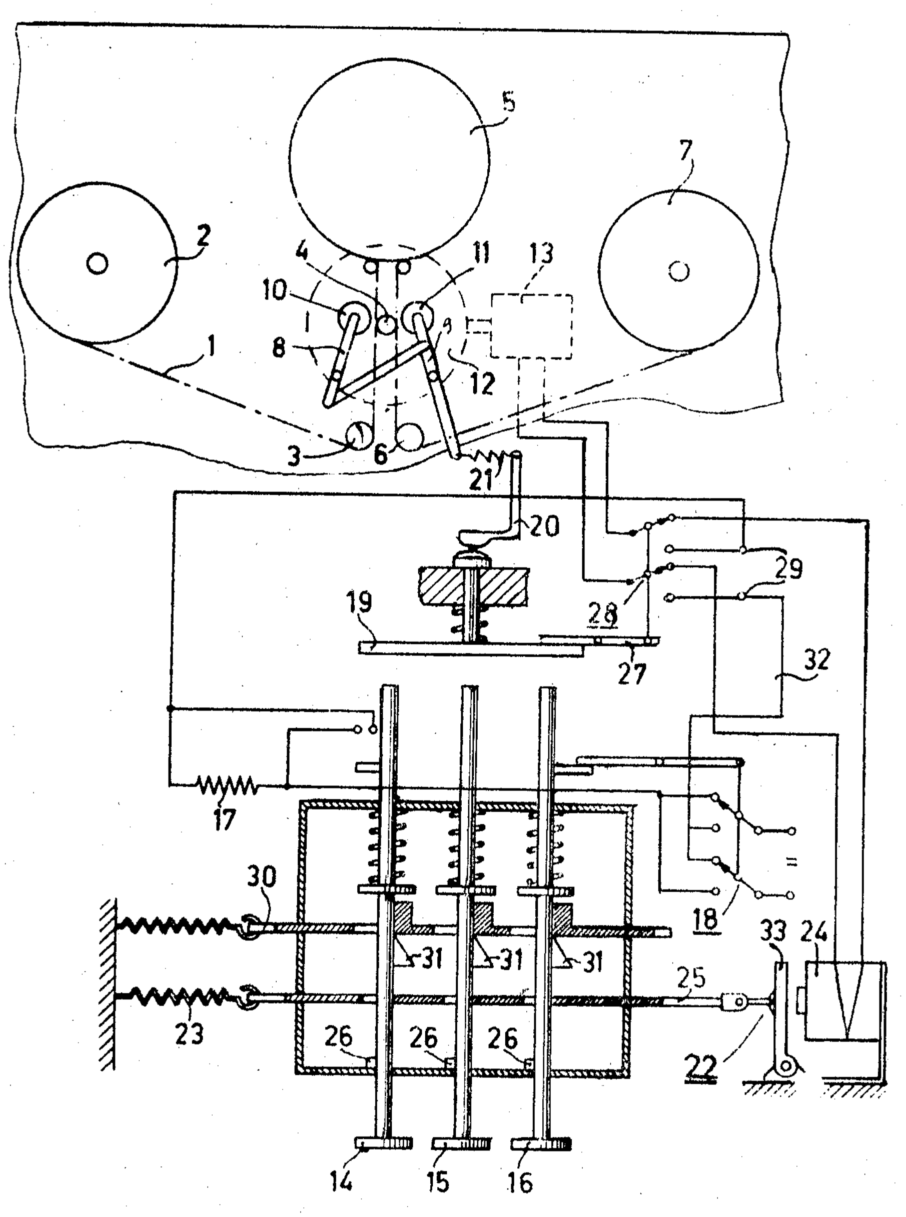

This invention relates to devices for switching the movements of a tape-shaped record carrier in recording and/or play-back apparatus and made particularly to a device in which a driving spindle, provided for driving the tape-shaped record carrier, is continuously connected to a flywheel and an electric motor whose speed and/or direction of rotation can be changed-over.

In apparatus of the kind above referred to, difficulties arise which may jeopardize faultless operation of the apparatus, particularly if a comparatively high speed record carrier is necessary. In fact, if movement is interrupted, and electric motor for the driving spindle is switched off from the supply voltage, the driving spindle will continue to rotate due to the action of the flywheel and come to a standstill relatively slowly. During this running out of the driving spindle, the motor generates an EMF because of the following movement of the driving spindle. Since the EMF polarity will result in a voltage being added to the motor supply voltage as soon as the latter is switched on for further obtaining movement with an opposite direction of rotation the electric motor or the electronic device controlling it may be overloaded due to excess voltage. To prevent the motor or its control device from being damaged, it is therefore necessary to take steps to ensure that the motor cannot be connected to the supply voltage again until it has come to a standstill.

Under certain conditions a further difficulty arises in that, if further movement is effected as the driving spindle is running down, the record carrier will be instantaneously driven by the still rotating driving spindle, and the record carrier is thus very liable to be ruptured. But even if the record carrier is not ruptured it is still heavily loaded by tensile forces so that local variations in length may occur and interfere with further use.

Further, under certain conditions, a loop may be formed in the record carrier and this, as is well known, is also to be avoided. Such a loop may occur if the supply voltage drops out even though for a short period only. In this case rotary parts which have a comparatively great moment of inertia and, which are not braked directly rotate further, resulting in the record carrier being wound further off the supply reel but no longer being taken up.

The present invention eliminates the above-mentioned difficulties in a simple manner and, to this end, a recording and/or play-back apparatus of the aforementioned kind includes a device for switching the movements of a record carrier. The device is characterized in that a lock with a control device is provided with inactive operating members for switching the various movements or for displacing parts of the apparatus. The control device becomes operative upon switching off movement by interrupting the current circuit of the electric motor and applying a control magnitude to the lock as a function of the speed of rotation of the electric motor as it is running down, so that the lock is operative until the motor has reached a substantial stop.

In the sense of the invention the term "locking of the operating members" is to be understood as meaning that not only can these members not be operated but also that these members can be operated but their functioning is prevented. Such locks are usually built up with the aid of relays which may co-act, if desired, with further mechanical locking devices, electronic switches, etc. Such a device according to the invention, apart from avoiding the above-mentioned difficulties, affords the advantage that the operator of an apparatus equipped with such a device is no longer obliged, upon interruption of a movement, to wait until the driving spindle has stopped before switching on another movement. The desired form of movement may instead be chosen immediately and this new movement is adjusted automatically after unlocking has taken place due to the disappearance of the control magnitude provided by the control device. The reliability of operation and the simplicity of operation of such apparatus are thus considerably increased.

A preferred embodiment of the device according to the invention is characterized in that the control device includes an electric motor for driving the driving spindle and a change-over switch which is operated upon switching off a movement of the record carrier and by which at least part of the winding of the motor may be connected to an electrical operating member of the lock. In this embodiment the control magnitude is provided in a simple manner by the motor itself and for this purpose use is made of the EMF generated as the motor is running down.

Another embodiment of the device according to the invention which may be used employs a control device constituted by a centrifugal switch connected to the driving spindle and having a make contact which includes a contact opened upon the switching-on of record carrier movement by the operating members or the parts of the apparatus actuated by these operating members, or which is closed upon switching off such a movement, together with an electrical operating member of the lock, in series with a current circuit, comprising a voltage source.

Suitable control devices are taken very generally, all devices providing a signal which is either constant or proportional to the rotational speed of the motor, the flywheel and the driving spindle. Such devices also include, for example, pulse sources which provide a signal by optical or electromagnetic means. Further the driving spindle could be provided with an apertured disc which periodically passes a light ray directed onto a photoelectric element, resulting in pulses proportional to the rotational speed of the disc, which may be used as a control magnitude. In this connection it should be noted that the device does not need a separate flywheel if the parts connected to the driving spindle such as, for example, the rotor of the motor, have a sufficiently great moment of inertia so that flywheel action occurs.

The record carrier may be pressed against the driving spindle in various ways, for example, by means of vacuum or one or more pressure rollers. When using at least one pressure roller it is, according to a special embodiment of the invention, advantageous that a separate operating member is provided for switching the pressure roller, while the rotational speed and/or the direction of rotation of the motor may be switched by the remaining operating members. The current circuit of the motor includes two series-contacts which are closed respectively upon operating the operating members for the pressure roller and upon operating one of the remaining operating members. The change-over switch or the contact of the control device is maintained, by means of electrical or mechanical forces, in a position in which the control device is switched off from the lock and is switched by merely backsetting one of the operating members to its rest position, into the position in which the control device acts on the lock and maintained in this switched position by the control magnitude provided by the control device during the running down of the driving spindle, the flywheel and the motor.

Such a device affords the advantage that the pressure roller need not be displaced upon each variation in the kind of movement. This is important if, for example, two pressure rollers are used since in such a case the displacing forces are comparatively great. Two pressure rollers are often used if a loop is formed in the record carrier and the latter must be driven by the driving spindle before and after the loop. This is frequently the case in video-tape apparatus including a drum. By switching over the control device and the lock in accordance with the invention, a perfect safety against faulty operation is also provided in the last-mentioned apparatus. As a matter of fact, it is not strictly necessary that two series-contacts are present which are closed respectively by the operating member for switching the pressure rollers and by the remaining operating members but it also suffices to use only one such contact which is closed only upon operation of the operating member for switching the pressure rollers and one of the remaining operating members.

A very advantageous device which is characterized by a very simple method of switching is obtained if the changed-over switch or the contact of the control device is maintained, by electrical or mechanical forces, in the switched position. In this method, the control device acts on the lock and is switched to the other switched position only upon operation of the operating member for switching the pressure roller or rollers and one of the remaining operating members.

The switch or the contact of the control device may be held and operated in a simple manner by means of a relay. This relay may have an additional contact which, instead of the series-contacts in the circuit of the motor, switches on the motor, so that the motor is switched through an auxiliary circuit. If the motor is used as the control device the change-over switch of the control device is advantageously also used for switching the circuit of the motor. Since the above-mentioned relay passes on at least a number of the switching functions of the operating members the latter may be locked in a very simple manner by including a switch as a lock in the circuit of the relay which is opened by the control device for locking the operating members.

Control devices are known, such as, for example, a control device using a motor provides a voltage which decreases with the running-down of the driving spindle. To ensure that in such a case the lock is active long enough, it is advantageous to amplify the control amplitude so as to be limited in amplitude over a sufficiently long period of time during the running down of the driving spindle, thus constituting a constant signal. Such amplification and limitation may be achieved in a simple manner with a circuit including two DC-coupled transistors.

A very advantageous embodiment of the device according to the invention is obtained if the operating member for switching the pressure roller or rollers is held in its operating position against spring force by means of an electromagnet powered by the current source of the apparatus. If this electromagnet has a locking armature and is connected to the control device in the rest position of the operating member for switching the pressure roller or rollers and connected to the current source of the apparatus in its operating position, it serves for both locking and holding the operating member. This results in very simple protection of the apparatus against faulty operation if the supply drops out since in this case the pressure roller or rollers are automatically lifted off the driving spindle and all the operating members are locked as the driving spindle is running down.

In order that the invention may be readily carried into effect, it will now be described in detail, by way of example, with reference to a few embodiments shown in the accompanying diagrammatic drawings.

Figure 2:
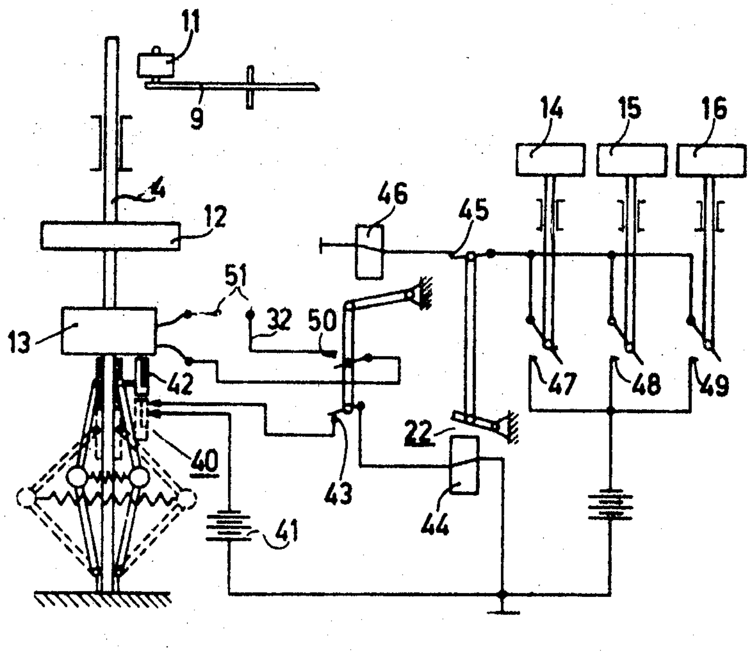
Figure 3A:
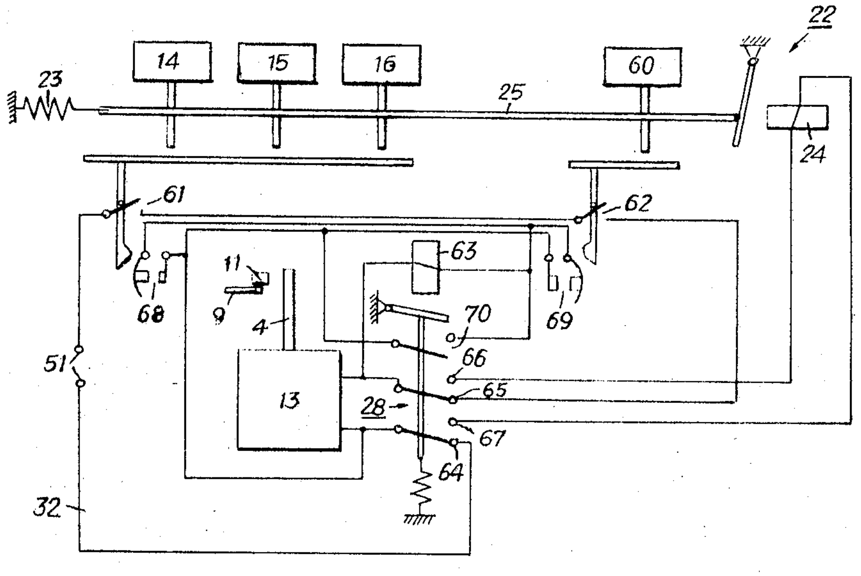
Figure 3B:
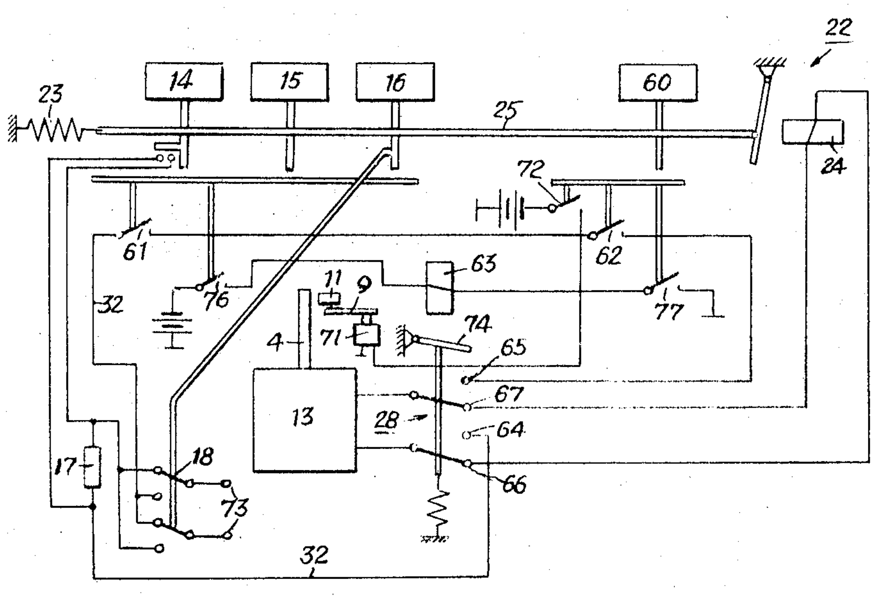
Figure 4:
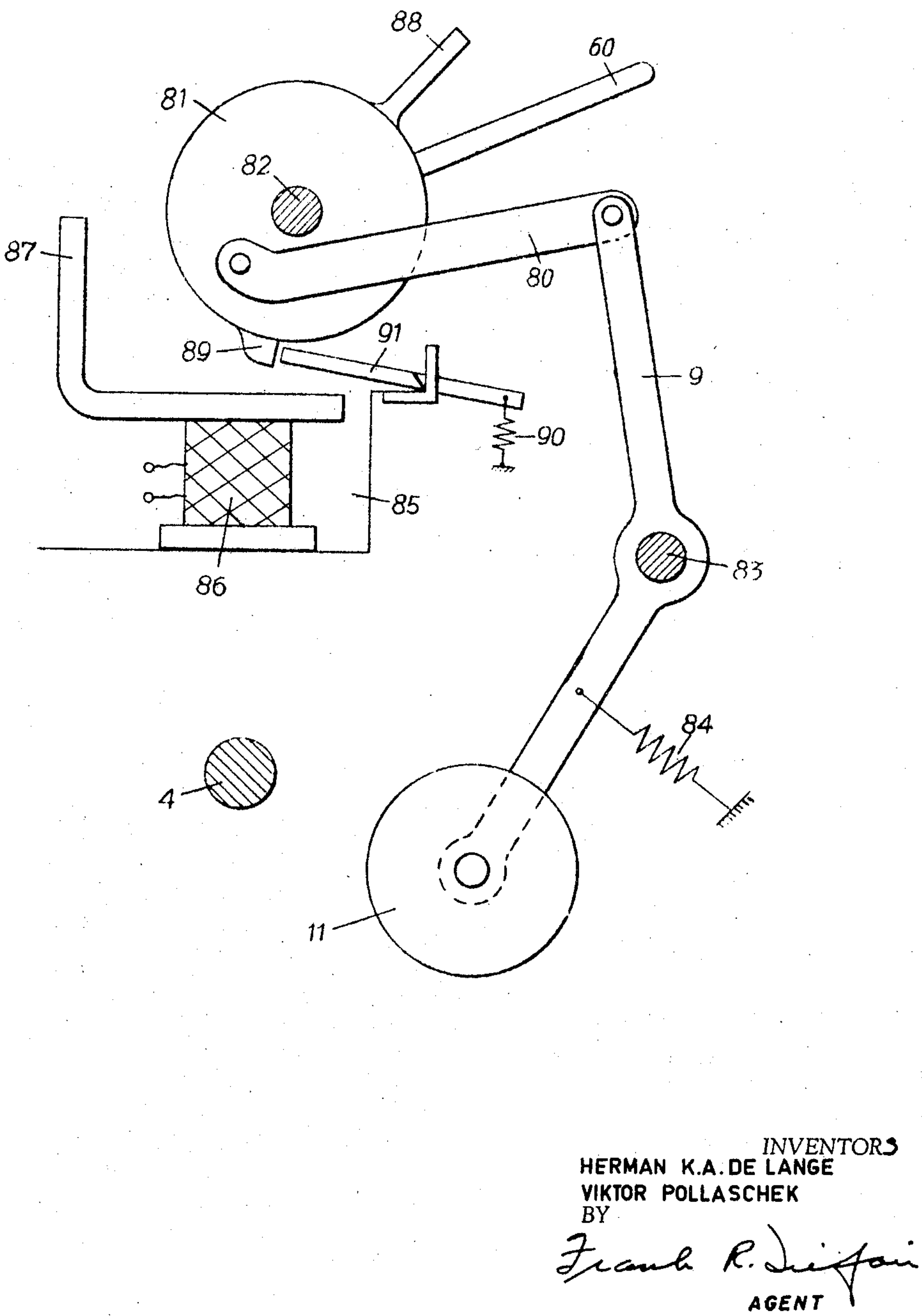
Figure 5:
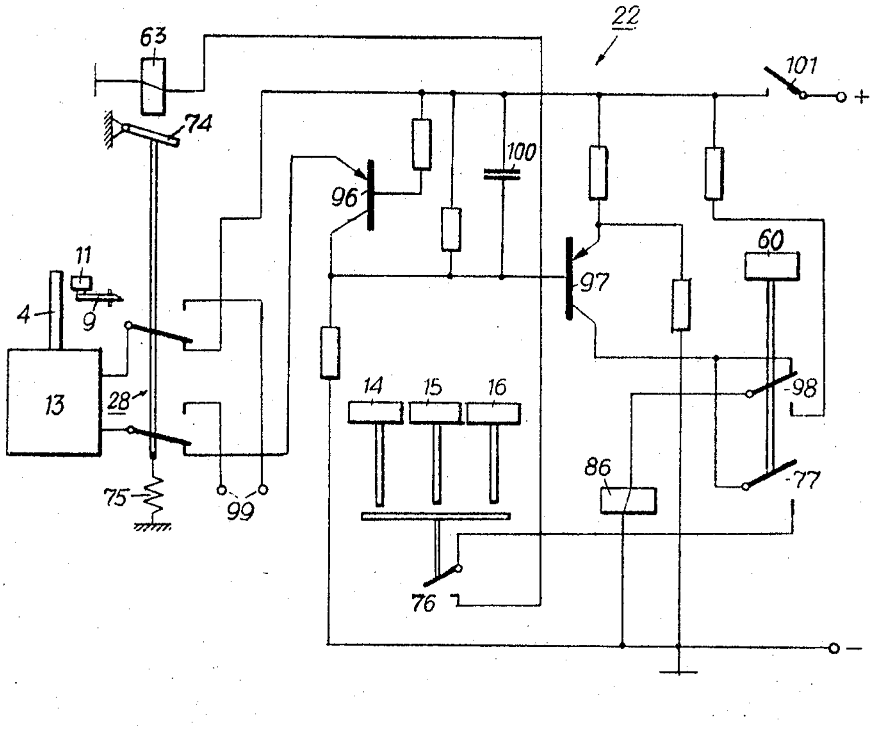

FIGURE 1 shows a device for switching the various movements including a lock, wherein the electric motor, which drives the driving spindle, serves as a control device, whereas in the device shown in FIGURE 2 the control device used is a centrifugal switch. FIGURES 3*a* and 3*b* show further embodiments of devices according to the invention which include a separate operating member for switching the pressure roller or rollers. FIGURE 4 shows a very advantageous embodiment of a lock for a separate operating member for switching the pressure roller or rollers and FIGURE 5 shows a device having an electronic switch as a lock.

In the recording and/or play-back apparatus of FIGURE 1 a record carrier 1 coming from, for example, a left-hand reel 2 is led through a tape guide 3 along a driving spindle 4, then along the periphery of a drum 5, again along the driving spindle 4 and eventually wound, after passing a second tape guide 6, onto a right-hand reel 7. The record carrier is moved on by being pressed against the driving spindle 4 with the aid of pressure rollers 10, 11 provided for this purpose on displaceable levers 8, 9. The driving spindle 4 is continuously connected to a flywheel 12 and a driving motor 13.

Operating members 14, 15 and 16, which may have the form of buttons, levers, switches or the like, serve to switch the forms of movement.

The desired movement of the record carrier is obtained by operating on the one hand, the pressure rollers 10, 11 and, on the other hand, switching on the correct value and polarity of the supply voltage for the motor 13 so as to give it the required rotational speed and direction of rotation. Thus, for example, the buttons 14, 15 and 16 serve to switch respectively the quick forward running, the normal forward running and the backward running. The quick forward running is obtained by shortcircuiting a resistor 17 and the backward running reversing the polarity of the supply voltage of the motor by means of a switch 18. The pressure rollers 10 and 11 provided on the levers 8, 9 are displaced by means of a switching member 19 through a lever 20 and a spring 21. It is of course not necessary that two pressure rollers are present and it is fundamentally possible to use only one pressure roller as is common practice, for example, if no loop is formed in the record carrier.

The lock for the operating members is shown at 22 and comprises in this example, a locking rail 25 which is displaceable, against the action of a spring 23, by means of an electromagnet 24 and which co-acts with projections 26 provided on the operating members. In this example the control device for the lock 22 is formed by the electric motor 13 the winding of which is connected through a change-over switch 28 operated by the operating members 14, 15 and 16 via the switching member 19 and a lever 27 to either the lock 22 or terminals 29 to which the required supply voltage for the motor is applied.

Further a holding rail 30, which is subject to the action of a spring, is provided for the operating members 14, 15, and 16 and co-acts in the usual manner with sloping projections 31 provided on the buttons. This holding rail serves in known manner also to release a button already depressed, so that each time only one button can be operated. As a matter of fact, the locking of the buttons with respect to one another could be solved in a different manner, for example, so that, if one button is depressed, the other buttons are locked and the depressed button can be restored to its initial position by pressing through. It would also be possible, however, to provide a single unlocking button for all the buttons. However, these details are not essential to the inventive idea.

FIGURE 1 shows the component parts of the device in their rest position, that is to say with the electric motor 13 at rest. The function of the described device is such that, with stationary motor, one of the operating members 14, 15, 16 for switching a movement can be operated each time so that the switch 28 is changed-over by means of the switching member 19 and the lever 27, the motor winding thus being switched off from the lock 22 and connected to the required supply voltage. After operation of one of the operating members the motor starts to rotate, the pressure rollers engage against the tape and the desired movement is established. If an existing movement is interrupted by operating, as previously stated, a non-depressed operating member, the depressed operating member returns to its rest position so that the pressure rollers disengage from the tape and the switch 28 switches off the motor winding from the supply voltage by interrupting the current circuit 32 of the motor, connecting it to the lock 22. This takes place before the operating member now operated can snap into the holding rail, so that the lock 22 is enabled to become operative. The motor which is running down generates in its winding an EMF which energizes the electromagnet 24 of the lock 22 so that by means of its armature 33 the locking rail 25 is displaced, thus locking in all of the operating members 14, 15 and 16 through their cams 26. It is not until the motor 13 has substantially stopped that the voltage provided by it is so low that the armature 33 of the electromagnet 24 is released again so that the locking of the operating members is eliminated and a further movement can be switched on.

The operating members themselves may be locked in a variety of ways without passing beyond the scope of the invention. This may be effected, as previously described, by mechanically locking the operating members themselves or, for example, by locking only the parts of the apparatus displaced by them, such as, for example, supports for pressure rollers, etc. Electrical locking operations may advantageously be effected, for example, with the aid of relays, so that it may be achieved that the operating members even if locked, remain operable, but their functions to be switched do not become active until after unlocking.

However, neither the design of the lock 22 itself is limited to an electromagnet and this may take the form of an electronic switch or equivalent device. It is essential only that the lock is capable of reacting to a control magnitude derived from the rotational speed of the driving spindle. As a matter of fact, amplifying elements may be provided for amplifying the control magnitude, or the phase of the control magnitude may be adapted in a suitable manner to the lock employed.

It will be evident from the foregoing that a device of the kind described permits switching of movement only if the driving spindle, the fly-wheel and the electric motor have at least substantially stopped. It is thus ensured that both the motor and its control device cannot be damaged by excess voltages and also the record carrier cannot be exposed to impermissible load.

FIGURE 2 shows another embodiment of a device according to the invention in which the control device is constituted by a centrifugal switch 40 in conjunction with with a current source 41. The centrifugal switch 40 is mounted on the driving spindle 4 which also carries the flywheel 12 and the rotor of the driving motor 13. The centrifugal switch controls a make contact 42 included in series with a test contact 43 and a relay 44, which constitutes the lock 22, in the circuit of the current source 41. The relay 44 causes the operating members 14, 15 and 16 to be locked or released through its rest contact 45 included in an electric switching circuit of the said operating members. In this example, the movements are switched in combination with a relay 46 included in the electric switching circuit of the operating members. This switching circuit includes contacts 47, 48 and 49 associated with the operating members, together with the contact 45 of the relay 44. The relay 46 operates a make contact 50 included in the current circuit of the motor, together with the rest contact 45 in the current circuit of the relay 44. If desired, the relay 46 may operate one or more further contacts which, in combination with further contacts associated with the operating members, bring about the switching of the desired movement, for example, the changeover of the rotational speed and/or direction of rotation of the motor and the pressing of the pressure rollers against the tape, for example as in the device of FIGURE 1, but this is not shown.

In the rest position of the device, and hence with the driving spindle 4 at rest, the contact 42 of the centrifugal switch 40 is open and hence the relay 44 is currentless and the contact 45 is closed, as shown in FIGURE 2. So the device is unlocked. In this case the current circuit of the relay 46 is completed by operating one of the operating members 14. 15 and 16 and the said relay energized, thus causing the driving motor 13 to be connected through contact 50 to the supply voltage applied to terminals 51. Further the contact 43 is opened so that the control device formed by the centrifugal switch 40 and the current source 41 is switched off from the relay 44, which acts as the lock 22. The desired form of operation is thus switched-on. The driving spindle 4 rotates so that the contact 42 of the centrifugal switch 40 is closed and prepared for the next locking operation.

If a movement is interrupted by releasing an operated operating member, the relay 46 is de-energized, switching off the motor winding from the supply voltage by means of contact 50 and closing contact 43, so that the control device formed by the centrifugal switch 40 and the current source 41 is connected to the relay 44, which acts as a lock. Since the driving spindle 4, which is still rotating, closes the contact of the centrifugal switch 40, the relay 44 is energized and the contact 45 opened. From this it follows that the relay 46 can be energized and a movement switched on only if the driving spindle 4 has stopped and the contact 45 is closed again. However, this desired form of movement can be previously chosen, despite the action of the lock by operating the corresponding operating member, this movement previously chosen being automatically adjusted upon unlocking.

It will be evident that this embodiment encompasses a plurality of variants of the control device other lock and the switching circuit of the operating members are possible beyond the scope of the invention. By way of example, it is mentioned only that contact 42 of the centrifugal switch 40 can naturally be a rest contact insofar the remainder of the device is adapted thereto.

If in a recording and/or play-back apparatus of the kind so far described the record carrier is driven by the driving spindle by means of driving rollers for all the kinds of movement, it is advantageous to provide a separate operating member for operating the pressure roller or pressure rollers so as to avoid the need for operating them upon each change of movement. FIGURES 3*a* and 3*b* show diagrammatically the structure of such a device according to the invention. The separate operating device for operating the pressure roller or rollers 11 is shown at 60. The remaining operating members for switching on a kind of movement are again indicated by 14, 15 and 16 and in this example serve only to switch the rotational speed and/or the direction of rotation of the motor. As before, the device includes a lock 22 which acts on the operating members by means of the locking rail 25 as has been described, for example, the device of FIGURE 1. In this example, the control device for the lock is again formed by the motor 13 the winding of which is connected to the switch 28 which couples it to either the lock 22 or the motor circuit 32 which provides the supply voltage for the motor 13 and is connected to the terminals 51. The current circuit 32 also includes two series-contacts 61 and 62 which are closed respectively upon operating the operating members 14, 15 and 16 for switching the rotational speed and/or the direction of rotation of the motor and upon operating the operating member 60 for displacing the pressure roller or rollers.

In the device of FIGURE 3*a* the switch 28 is operated by a relay 63 and connected, in the rest position of the operating members, to terminals 64, 65 included in the current circuit 32. The relay 63 is connected to the winding of the motor 13 through two contacts 68, 69, connected in parallel, which are closed each time for a short period only by the operating members 14, 15, 16 and by the operating members 60 respectively. A contact 70 likewise operated by the relay 63 shunts the contacts 68, 69 when the relay is energized so that the latter can hold itself. This is necessary since the contacts are closed only transiently upon operating the operating members. Further it is arranged that the contacts 68, 69 are operated earlier than the switches 61 and 62 are closed so that the motor is still separated from the supply voltage by the two contacts 61, 62, connected in series, when the contacts 68 and 69 are operated. The desired movement does not start until both the operating member 60 for switching the pressure roller or rollers and one of the operating members 14, 15, 16 are depressed. When the movement is switched off by one of the operating members, the motor becomes currentless again with the aid of the contacts 61, 62. Upon return of the depressed operating member to its rest position, first of all the circuit of the motor is interrupted by one of the contacts 61, 62, whereafter the corresponding contacts 68 or 69 is transiently closed. Consequently, the relay 63 is transiently connected to the winding of the motor 13 and responses when this winding gives off sufficient voltage due to the running down of the motor. As soon as this is the case, the relay further holds itself through a holding contact 70. Due to the response of relay 63, the switch 28 is also changed-over, thus connecting the winding of the motor 13 to the terminals 66, 67 of the lock 12 and hence making the lock operative. This change-over is maintained as long as the winding of the motor 13 provides a control magnitude, whereafter the relay 63 is de-energized and the switch 28 switches back to the terminals 64, 65. During this period, in which the switch was connected to the terminals 65, 66, the lock 22 was in function and has locked the operating members. The operating members are unlocked upon backsetting the switch when the driving spindle has already stopped at least substantially.

A very advantageous device is obtained if, according to FIGURE 3*b*, the switch 28 in the rest position of the operating members is connected to the terminals 66, 67 of the lock 22. The operating member 60 again serves to switch the pressure roller or rollers 11 provided on a lever 9 which is pivoted, for example, by a rotary magnet 71 as soon as the current circuit thereof is completed by a contact 72 controlled by the operating member 60. The rotational speed and/or the direction of rotation of the motor 13 is again changed-over by the operating members 14, 15, 16 which serve to switch respectively the rapid forward movement, the normal forward movement and the backward movement. The rapid forward movement is again obtained, for example as in the device of FIGURE 1, by short-circuiting a resistor 17 included in the current circuit 32 of the motor. The backward movement may be switched by reversing the polarity of the voltage applied to terminals 73 by means of switch 18. The contacts 61, 62 serve to switch, as in the device of FIGURE 3*a*, the current circuit 32 of the motor, the contact 61 being operated by the operating members 14, 15, 16 and the contact 62 by the operating member 60. The switch 28 may again be operated by means of an armature 74 of the relay 63, said switch by means of a spring 75 being held in its rest position in which the lock 22 is switched-on. The relay 63 itself is actuated by means of two series-contacts 76 and 77 which are associated respectively, analogous to the current circuit of the motor, with the operating members 14, 15, 16 and with the operating member 60.

Upon operating the operating member 60 for switching the pressure roller or rollers 11 or one of the remaining operating members the corresponding series-contacts 61 or 62 in the current circuit 32 of the motor, together with the corresponding contacts 76, 77 in the current circuit of the relay 63, are closed such as in the device of FIGURE 3*a*. It is not until the operating member 60 and one of the remaining operating members 14, 15, 16 have been depressed that the switch 28 changes-over from the lock 22 to the terminals 64, 65 in the current circuit 32 of the motor. When a movement is interrupted by one of the operating members upon return thereof to its rest position by interrupting the current circuit of the relay 63 the switch 28 immediately switches on the lock 22 which then locks the operating members, as previously explained several times, during the running down of the driving spindle 4.

The devices of FIGURES 3*a* and 3*b* as described above, may naturally be provided in either case with a control device as shown in FIGURE 2.

The device of FIGURE 3*b* may be simplified further. Thus, for example, the two series-contacts 61, 62 are not necessary since their function is already fulfilled by the contacts 76, 77 in combination with the switch 28. Further the operating members may simply be locked in a series-contact in the current circuit of the relay 63 which contact is operated by the magnet 24 so that the locking rail 25 is no longer required.

A very advantageous embodiment according to the invention of the above-described device is obtained in that the operating member 60 for switching the pressure roller or rollers 11 is held in known manner in an operating position occupied against the force of a spring by means of an electromagnet. According to the invention this electromagnet may also serve to lock the said operating member which need, of course, not be held or locked directly but may be locked by a part of the apparatus which has been operated by it. The advantage of such an arrangement consists in that the operating members are also locked if the mains drops out so that in this case too no damage can be caused to the apparatus or the record carrier.

Such a device is shown in FIGURE 4 in which 60 again indicates the operating member, which is now designed, for example, as a pivotable lever, by which the pressure roller 11 provided on a support 9 may be urged against the driving spindle 4 by means of a lever 80 connected to the operating member 60 through a disc 81. The operating member 60 is rotatable about a shaft 82 and the support 9 about a shaft 83. A spring 84 provides for a corresponding backsetting force. The shaft 82 is arranged on a mounting plate 85 which also carries an electromagnet 86 having a pole piece 87 which co-acts with an armature 88 provided on the disc 81 as soon as the pressure roller 11 is urged against the driving spindle 4. The disc 81 also has a cam 89 which co-acts with a second armature 91 which is adjustable against a spring 90.

The function of this arrangement is such that, as soon as the electromagnet 86 is de-energized, the pressure roller 11 invariably occupies the position turned away since the armature 88 is not held. At the same time the operating member 60 is locked since the armature 91 slides in front of the cam 89, preventing a rotational movement of the operating member. It is not until the electromagnet 86 has been energized that the armature 91 is attracted, thus releasing the operating member 60. If the operating member 60 for urging the pressure roller 11 against the driving spindle 4 is swung round the armature 88 assumes its operating position and remains in it due to its cooperation with the pole piece 87. For setting back to the rest position and locking the operating member by means of the armature 11 it suffices to interrupt the energizing current of the electromagnet 86. Setting back the operating member 60 without at the same time locking it may be obtained by manually setting the operating member 60 to its rest position so that the armature 88 is detached from the pole piece 87. Since, as previously stated, if the electromagnet 81 is currentless, locking takes place, if desired, in combination with backsetting of the operating member and the pressure roller, a safety of the apparatus is guaranteed even if the mains drops out, because of the locking of the operating member which then necessarily occurs.

If it is further ensured that, after backsetting the operating member to its rest position, the electromagnet is connected to a lock which in its locked position can interrupt a current circuit, for example, such as described and used in the device of FIGURE 5, it is guaranteed that the operating member is also locked as the driving spindle is running down. The electromagnet may be connected to a lock, as mentioned hereinbefore, by means of a switch (98, FIGURE 5) which can be operated by the operating member 60 itself which switch connects the electromagnet 86 to the lock in the rest position of the operating member 60 and, upon operation thereof, to the supply voltage of the apparatus so that in this position of the switch the pressure roller 11 is further held in the operating position. Such an arrangement will be described in detail with reference to the embodiment of FIGURE 5.

It is to be noted that it is not strictly necessary that the operating member 60 in FIGURE 4 is a pivotable lever. The same arrangement may also be obtained with, for example, a push button. Further the designer has been left great freedom in the design of the lever system and of the armatures etc. without passing beyond the scope of the invention.

FIGURE 5 shows a very advantageous device according to the invention on the principle of the arrangement of FIGURE 3*b*, in combination with an arrangement of FIGURE 4 for the operating member 60 for switching the pressure roller or rollers. In the rest position the switch 28 which may be operated by the relay 63, is again connected to the lock 22, the lock employed in this example, being an electronic switch included in the current circuit of the relay 63. This current circuit also includes, as previously described, the contacts 76 and 77 which may be operated by the operating members 14, 15, 16 and 60 respectively.

The lock in this example is consistituted by two co-operating transistors 96, 97. If the driving spindle 4 is rotating the voltage provided by the motor 13 controls a first transistor 96 which amplifies and rectifies the said voltage and also brings about a separation from the next circuit. The amplified rectified voltage controls a second transistor 97, which acts as a switch, to such an extent that this transistor limits the signal and thus still occupies a given switched position even with decreasing amplitude of the voltage provided by the motor 13.

In the rest position of the operating member 60, the electromagnet 86 (corresponding to FIGURE 4) for holding the said member in its operating position is connected to the lock 22, that is to say in the collector circuit of transistor 97, through a switch 98 which may be operated by the operating member 60. By means of switch 98 the magnet 86 is connected to the supply voltage of the device for holding itself upon operating the operating member 60.

The further contacts of the operating members 14, 15 and 16 for switching the rotational speed and/or the direction of rotation of the motor by varying the supply voltage for the motor 13 applied to terminals 99 are not shown in this example.

The function of the device is analogous to the devices previously described, as follows:

If none of the operating members has been operated and the motor 13 is at rest, no signal is applied to the transistor 96 by the motor 13. The subsequent transistor 97 is in this case conducting, the magnet 86 energized and hence the operating member 60 unlocked since the armature 91 (FIGURE 4) is attracted. The remaining operating members 14, 15 and 16 are still inactive since the operating member 60 has not yet been operated and hence the contact 77 is open. If the operating member 60 for urging the pressure rollers is operated, the switch 98 is changed over so that the electromagnet 86 is connected to the supply voltage and holds itself. Further the contact 77 is closed. If, now, one of the operating members 14, 15, 16 is operated, the contact 76 is also closed, causing the relay 63 to be energized. The latter changes-over the switch 28 so that the motor 13 is connected to the supply voltage, thus establishing the desired form of movement.

If a movement is interrupted by backsetting an operated operating member 14, 15, 16, the relay 63 becomes currentless so that the winding of the motor 13 is again connected via the switch 28 to the input of transistor 96. Now this transistor amplifies the positive half cycles applied to its emitter, of the r.p.m. generated by the motor which is running down, which half cycles whilst being rectified build up a voltage at charging capacitor 100 causing the potential of the base of transistor 97 to be varied such that this transistor is cut-off. Consequently, the relay 63 cannot respond upon operation of one of the operating members 14, 15, 16 so that the functions of these buttons are locked. It is not until the motor 13 no longer produces an EMF and the cut-off voltage at the capacitor 100 has decreased, that is to say the driving spindle has stopped at least substantially, that the transistor 97 becomes conducting again, so that another movement can be switched on. Similar operations occur due to the action of the contacts 77 and 98 respectively upon backsetting the operating member 60.

If the mains voltage drops out during operation or when the apparatus is switched off by means of a main switch 101, the electromagnet 86 becomes currentless so that the operating member 60 returns to its rest position, the pressure roller 11 disengages from the tape, the switch 98 switches the electromagnet 86 into the output circuit of transistor 97, while at the same time the switch 77 is opened, thus making the lock 22 operative, as described. Since the electromagnet 86 is now included in the output circuit of transistor 97, the non-conducting transistor 97, while the motor is running down, prevents the magnet 86 from being energized which magnet locks the operating member 60 through its second armature 91 (FIGURE 4). It is not until the driving spindle has stopped at least subsantially, thereby assuming, of course, that mains voltage is available again, that the pressure roller or a form of movement can be switched-on.

It will be evident that it is also possible to use npn-type transistors and to introduce modifications into the circuit design which are common practice in the art and adapted to the relevant device such as, for example, the transistor 97 in the presence of a control magnitude becomes conducting instead of cut-off.

What is claimed is:

1. A device for switching the movement of a tape-shaped record carrier comprising, a driving spindle for driving the tape-shaped record carrier, said driving spindle being continuously driven by an electric motor, means applying an electric current supply to said motor, a plurality of operating members for selectively switching the movement of said tape-shaped record carrier, control means including an electromagnet having a spring biased shaft for locking inactive ones of said operating members, means for activating said control means upon interruption of the flow of current from said supply to said motor, means for deriving a control signal having a time duration proportional to the time required for the rotation of said motor to come to a substantial stop, and means applying said control signal to said electromagnet during activation of said control means to thereby maintain said operating members in their locked position for the duration of said control signal until said motor rotation has substantially ceased.

2. A device as claimed in claim 1 wherein the control means includes an electrically operable lock, a portion of the winding of said electric motor, and a change-over switch operable upon the switching of a movement of the record carrier, said change-over switch responsive to the switching of a movement of said carrier for connecting at least a portion of the winding of the motor to the electrically operable portion of said electromagnet.

3. A device for switching the movement of a tape-shaped record carrier, comprising, a driving spindle for driving the tape-shaped record carrier, said driving spindle being continuously driven by an electric motor having a control winding, means applying an electric current supply to said motor, a plurality of operating members for selectively switching the movement of said tape-shaped record carrier, control means including an electrically operable lock and a change-over switch operable upon the switching of a movement of the record carrier, said change-over switch responsive to the switching of a movement of said carrier for coupling at least a portion of the winding of said motor to the electrically operable portion of said lock, said control means locking inactive ones of said operating members, means for activating said control means upon interruption of the flow of current from said supply to said motor, means for deriving a control signal having a time duration proportional to the time required for the rotation of said motor to substantially cease, means including said change-over switch for applying said control signal to said electrically operable lock during activation of said control means to thereby maintain said operating members in their locked position for the duration of said control signal until said motor rotation has come to a substantial stop, said device further including at least one pressure roller for urging the record carrier against the driving spindle, a further operating member for switching the pressure roller, the current circuit of the motor including two series-contacts which are closed respectively upon operating the operating member for the pressure roller and upon operating one of the remaining operating members and means for maintaining said change-over switch in the switched position whereby the control device acts on the lock, said switch being switched to the other switched position only upon operation of the operating member for switching the pressure roller and one of the remaining operating members.

4. A device as claimed in claim 3 wherein a relay is provided for holding and operating the change-over switch or the contact of the control means, the circuit of said relay including two series-contacts which are closed respectively upon operating the operating member for switching the pressure roller and upon operating one of the remaining operating members.

5. A device as claimed in claim 4, wherein the change-over switch of the control means operated by said relay also serves to switch the current circuit of the motor.

6. A device as claimed in claim 5, wherein the circuit of the relay includes a switch as a lock which is opened by the control means for locking the operating members.

7. A device as claimed in claim 6, wherein a switch for amplifying and limiting the control signal is formed by a transistor the input circuit of which includes a charging capacitor and the base of which is DC-coupled to the collector of a further transistor of the same conductivity type, the control magnitude being applied to the input circuit of the last-mentioned transistor and the biasing potentials of the transistors being chosen so that one transistor is cut-off and the other is conducting.

References Cited

UNITED STATES PATENTS

| | | | |
|---|---|---|---|
| 1,770,723 | 7/1930 | Wyman | 318—284 |
| 2,376,299 | 5/1945 | Wendelburg et al. | 318—284 |
| 3,230,435 | 1/1966 | Andrews | 318—284 |

ORIS L. RADER, *Primary Examiner.*

K. L. CROSSON, *Assistant Examiner.*

U.S. Cl. X.R.

318—305